(12) United States Patent
Funakoshi et al.

(10) Patent No.: US 6,608,165 B2
(45) Date of Patent: Aug. 19, 2003

(54) AROMATIC POLYCARBONATE AND PRODUCTION PROCESS THEREFOR

(75) Inventors: Wataru Funakoshi, Iwakuni (JP); Hiroaki Kaneko, Iwakuni (JP); Yuichi Kageyama, Iwakuni (JP); Takanori Miyoshi, Iwakuni (JP); Katsushi Sasaki, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/130,048

(22) PCT Filed: Sep. 7, 2001

(86) PCT No.: PCT/JP01/07777

§ 371 (c)(1),
(2), (4) Date: May 13, 2002

(87) PCT Pub. No.: WO02/22708

PCT Pub. Date: Mar. 21, 2002

(65) Prior Publication Data

US 2003/0060593 A1 Mar. 27, 2003

(30) Foreign Application Priority Data

Sep. 12, 2000 (JP) .......................................... 2000-276320
Sep. 12, 2000 (JP) .......................................... 2000-276321

(51) Int. Cl.$^7$ ................................................. C08G 64/00
(52) U.S. Cl. ........................................ 528/196; 528/198
(58) Field of Search ................................. 528/196, 198

(56) References Cited

FOREIGN PATENT DOCUMENTS

| EP | 0 872 507 A2 | 10/1998 |
|----|--------------|---------|
| EP | 0 926 181 A2 | 6/1999 |
| JP | 2-153927 | 6/1990 |
| JP | 4-046928 | 2/1992 |
| JP | 4-089824 | 3/1992 |
| JP | 4-175368 | 6/1992 |
| JP | 5-148355 | 6/1993 |
| JP | 6-032885 | 2/1994 |
| JP | 7-033866 | 2/1995 |

*Primary Examiner*—Terressa M. Boykin
(74) *Attorney, Agent, or Firm*—Sughrue Mion, PLLC

(57) ABSTRACT

A polycarbonate having excellent color and stability and a production process therefor.

In the production of a polycarbonate by melt polycondensing a dihydroxy compound and a carbonic acid diester in the presence of an ester exchange catalyst, the each content of an aldehyde group in the dihydroxy compound and the carbonic acid diester is reduced to $3 \times 10^{-6}$ equivalent/mol or less.

16 Claims, No Drawings

AROMATIC POLYCARBONATE AND PRODUCTION PROCESS THEREFOR

FIELD OF THE INVENTION

The present invention relates to an aromatic polycarbonate and a production process therefor. More specifically, it relates to a process for producing an aromatic polycarbonate from an aromatic dihydroxy compound and a carbonic acid diester, both having a low content of an aldehyde compound, by an ester exchange method and to an aromatic polycarbonate having excellent color and stability obtained by the above process.

PRIOR ART

Polycarbonates which are superior to other resins in moldability, mechanical strength and optical properties such as achromatic transparency are widely used as materials for transparent substrates for recording media which record and/or reproduce information using laser light, such as audio disks, laser disks, optical disk memories and magneto-optic disks, as well as for transparent sheets and lenses.

The polycarbonates are produced from an aromatic dihydroxy compound and a carbonic bond forming precursor. As the production process thereof are known an interfacial polycondensation process in which phosgene is directly reacted as the carbonate bond forming precursor and a melt polycondensation process in which an ester exchange reaction between a carbonic acid diester and phosgene is carried out. The melt polycondensation process has such an advantage that a polycarbonate resin can be produced at a lower cost than the interfacial polycondensation process.

A polycarbonate produced by an ester exchange melt polycondensation process using a conventionally known ester exchange catalyst such as an alkali metal salt catalyst, for example, sodium hydroxide is disclosed in "Plastic Material Course (17) Polycarbonate, Chapter 4, pp. 48–53" published by Nikkan Kogyo Shimbun Co., Ltd. Since this polycarbonate is obtained by polymerization by distilling off a monomer component such as a phenol, an aromatic dihydroxy compound or diphenyl carbonate at a temperature of 250° C. or more for 1 hour or more, undesired side reactions such as branching or decomposition occur during this polymerization. These undesired side reactions include a decarboxylation reaction and a Kolbe-Schmitt similar reaction described in "Chemistry and Physics of Polycarbonates, pp. 47–48" written by H. Schnell and published by Interscience Publishers Co., Ltd. When these side reactions occur, color developing impurities or a branch structure are formed in the obtained polycarbonate and the obtained polycarbonate is apt to deteriorate in color and to become inferior in heat resistance and hydrolysis resistance as it contains a hetero-bond component other than its own carbonate bond in the molecule, or in homogeneity and transparency as it contains a gelled substance.

Therefore, the application of a polycarbonate produced by the melt polymerization process is restricted compared with a polycarbonate produced by the interfacial polymerization process.

To solve the above problems, paying attention to metal impurities contained in a carbonic acid diester and/or an aromatic dihydroxy compound which are raw materials for the production of an aromatic polycarbonate, there are proposed a method for reducing the content of an element such as Na, Fe, Cr or Mn (refer to JP-A 5-148355 and JP-A 6-32885) (the term "JP-A" as used herein means an "unexamined published Japanese patent application") and a method for reducing the amount of an inorganic non-metal ion such as hydrolysable chlorine (JP-A-2-153927).

Meanwhile, as for organic impurities contained in the carbonic acid dieter and/or aromatic dihydroxy compound, it is well known that organic impurities having a benzene ring are contained in the aromatic dihydroxy compound such as 2,2-bis(4-hydroxyphenyl)propane (to be referred to as "bisphenol A" hereinafter) as disclosed in "High Purification Technology System, Vol. 3, High-purity Substance Production Process (published by Fuji Technosystem), pp. 149–160, 1997" and documents cited in the above document.

It is also known that a carbonate bond forming precursor, for example, a carbonic acid diester may contain an impurity having a salicylic acid structure which is a product of a decomposition reaction similar to a Kolbe-Schmitt reaction, or an impurity having a benzophenone skeleton.

It is also proposed to solve the above problems by controlling the amounts of organic impurities and the above metallic or inorganic ionic impurities contained in bisphenol A or carbonic acid diester (EP-A 872507 and JP-A 7-33866). However, it cannot be said that the obtained polycarbonate is satisfactory in terms of color and stability. That is, it cannot be said that problems with color and stability are completely solved for industrial-scale production.

Further, as proposals aimed to solve these problems using an ester exchange catalyst, JP-A 4-89824 discloses a catalyst which comprises 1) a nitrogen-containing basic compound, alkali metal compound and boric acid or boric acid ester, JP-A 4-46928 discloses a catalyst which comprises an electron donating amine compound and alkali metal compound, and JP-A 4-175368 discloses a technology for adding an acidic compound and epoxy compound to a polycarbonate produced by melt polycondensation in the presence of an alkali metal catalyst.

However, the problems with color and stability are not completely solved by the above conventional methods such as control of the amounts of impurities or selection of the type of catalyst.

SUMMARY OF THE INVENTION

It is an object of the present invention to provide a process for producing an aromatic polycarbonate which is excellent in color and stability by an ester exchange method.

It is another object of the present invention to provide a process for producing an aromatic polycarbonate which is excellent in color and stability and has a low content of a hetero-bond such as a branch structure.

It is still another object of the present invention to provide a process for producing an aromatic polycarbonate which is particularly excellent in color with a conventionally unknown minus b value.

It is a further object of the present invention to provide an aromatic polycarbonate which is excellent in both color and stability as described above.

Other objects and advantages of the present invention will become obvious from the following description.

According to the present invention, firstly, the above objects and advantages of the present invention are attained by a process for producing a polycarbonate by melt polycondensing a dihydroxy compound and a carbonic acid diester in the presence of an ester exchange catalyst, wherein a raw material which contains a dihydroxy compound represented by the following formula (1):

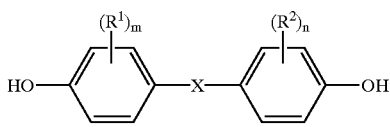

(1)

wherein R¹ and R² are each independently an alkyl group having 1 to 20 carbon atoms, alkoxy group having 1 to 20 carbon atoms, cycloalkyl group having 6 to 20 carbon atoms, aryl group having 6 to 20 carbon atoms, cycloalkoxy group having 6 to 20 carbon atoms or aryloxy group having 6 to 20 carbon atoms, m and n are each independently an integer of 0 to 4, and X is a single bond, oxygen atom, carbonyl group, alkylene group having 1 to 20 carbon atoms, alkylidene group having 2 to 20 carbon atoms, cycloalkylene group having 6 to 20 carbon atoms, cycloalkylidene group having 6 to 20 carbon atoms, arylene group having 6 to 20 carbon atoms or a group having 6 to 20 carbon atoms, and an aldehyde compound in an amount of no more than $3 \times 10^{-6}$ equivalent in terms of an aldehyde group based on 1 mol of the dihydroxy compound represented by the above formula (1) is used as one raw material comprising the above dihydroxy compound and a raw material which contains a carbonic acid diester and an aldehyde compound in an amount of no more than $3 \times 10^{-6}$ equivalent in terms of an aldehyde group based on 1 mol of the carbonic acid diester is used as the other raw material comprising the above carbonic acid diester.

According to the present invention, secondly, the above objects and advantages of the present invention are attained by an aromatic polycarbonate pellet which comprises an aromatic polycarbonate composed mainly of a recurring unit represented by the following formula (2):

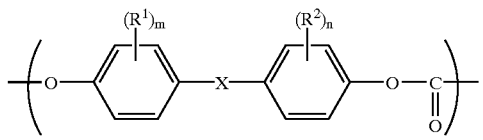

(2)

wherein R¹ and R² are each independently an alkyl group having 1 to 20 carbon atoms, alkoxy group having 1 to 20 carbon atoms, cycloalkyl group having 6 to 20 carbon atoms, aryl group having 6 to 20 carbon atoms, cycloalkoxy group having 6 to 20 carbon atoms or aryloxy group having 6 to 20 carbon atoms, m and n are each independently an integer of 0 to 4, and X is a single bond, oxygen atom, carbonyl group, alkylene group having 1 to 20 carbon atoms, alkylidene group having 2 to 20 carbon atoms, cycloalkylene group having 6 to 20 carbon atoms, cycloalkylidene group having 6 to 20 carbon atoms, arylene group having 6 to 20 carbon atoms or alkylene-arylene-alkylene group having 6 to 20 carbon atoms, and having a viscosity average molecular weight of 10,000 to 17,000 and a value of $1 \times 10^{-6}$ to $20 \times 10^{-6}$ obtained by dividing the average value of absorbance at a wavelength of 400 nm and absorbance at a wavelength of 430 nm by absorbance at a wavelength of 260 nm, and which has a b value of −1.0 to 0.0 measured in accordance with JIS K7105.

DETAILED DESCRIPTION OF THE PREFERRED EMBODIMENTS

The present invention will be described hereinbelow. A description is first given of the process of the present invention.

In the present invention, the one raw material comprising a dihydroxy compound contains a dihydroxy compound represented by the formula (1) and an aldehyde compound in an amount of no more than $3 \times 10^{-6}$ equivalent, preferably no more than $2 \times 10^{-6}$ equivalent, more preferably no more than $1 \times 10^{-6}$ equivalent in terms of an aldehyde group based on 1 mol of the dihydroxy compound represented by the formula (1). This raw material having a low content of an aldehyde compound can be advantageously prepared by contact hydrogenating a raw material containing an aldehyde compound in an amount of more than $3 \times 10^{-6}$ equivalent in terms of an aldehyde group based on 1 mol of the dihydroxy compound represented by the formula (1).

In the present invention, the other raw material comprising a carbonic acid diester contains a carbonic acid diester and an aldehyde compound in an amount of no more than $3 \times 10^{-6}$ equivalent, preferably no more than $2 \times 10^{-6}$ equivalent, more preferably no more than $1 \times 10^{-6}$ equivalent in terms of an aldehyde group based on 1 mol of the carbonic acid diester. The other raw material having a low content of an aldehyde compound can be advantageously prepared by contact hydrogenating a raw material containing an aldehyde compound in an amount of more than $3 \times 10^{-6}$ equivalent in terms of an aldehyde group based on 1 mol of the carbonic acid diester.

In the present invention, the total amount of aldehyde compounds contained in the one raw material comprising a dihydroxy compound and the other raw material comprising a carbonic acid diester is preferably no more than $3 \times 10^{-6}$ equivalent, more preferably no more than $2 \times 10^{-6}$ equivalent, particularly preferably $1 \times 10^{-6}$ equivalent in terms of an aldehyde group based on 1 mol of the dihydroxy compound represented by the above formula (1).

A contact hydrogenation reaction for the one raw material comprising a dihydroxy compound and the other raw material comprising a carbonic acid diester can be carried out on a mixture of the both materials.

The contact hydrogenation reaction is preferably carried out in a reaction solvent in the presence of a catalyst.

Preferred examples of the catalyst used for contact hydrogenation include conventionally known heterogeneous catalysts such as palladium-carbon, platinum-carbon, palladium black and ruthenium-carbon.

The reaction solvent used at the time of contact hydrogenation is preferably a lower alcohol in the case of the aromatic dihydroxy compound and an ether-based solvent in the case of the carbonic acid diester. Illustrative examples of the lower alcohol include methanol, ethanol and isopropyl alcohol, and illustrative examples of the ether-based solvent include tetrahydrofuran, dioxane and ethylene glycol dimethyl ether.

The content of the aldehyde group can be easily reduced to 3 $\mu$-equivalents or less based on 1 mol of the dihydroxy compound by contact hydrogenation. Preferably, the solvent contains no aldehyde compound. Further, to control the total content of specific metal components in the aromatic dihydroxy compound and the carbonic acid diester to a low level, a solvent for application in the electronic industry having a low total content of specific metal impurities is more preferred.

The content of the aldehyde group is measured by a fluorescent derivation technique described in "BUNSEKI KAGAKU Vol. 34, pp. 314–318, 1985". The aldehyde group detection limit of the technique is $0.5 \times 10^{-6}$ equivalent/mol or less.

The above aldehyde compound include aliphatic aldehydes such as formaldehyde, acetaldehyde and hexylaldehyde, alicyclic aldehydes and aromatic aldehydes.

The aldehyde compound is often contained in the dihydroxy compound and the carbonic acid diester as an impurity.

After contact hydrogenation, a conventionally known purification method such as cleaning, recrystallization, crystallization, sublimation purification or distillation is preferably carried out. A combination thereof is particularly recommended.

In the present invention, the one raw material contains a carboxylic acid compound in an amount of preferably no more than $3\times10^{-6}$ equivalent, more preferably no more than $2\times10^{-6}$ equivalent, particularly preferably no more than $1\times10^{-6}$ equivalent in terms of a carboxyl group based on 1 mol of the dihydroxy compound represented by the above formula (1).

The carboxylic acid compound includes lower carboxylic acids such as formic acid, acetic acid, propionic acid, oxalic acid, glycolic acid, malic acid, citric acid and tartaric acid. The content of the carboxylic acid compound which is the above upper limit or less can be attained by a purification method such as cleaning after the above contact hydrogenation.

Examples of the dihydroxy compound represented by the above formula (1) include BPA, bis(4-hydroxyphenyl) methane, bis(4-hydroxy-3,5-dimetylphenyl)methane, 1,1-bis(4-hydroxyphenyl)ethane, 1,1-bis(4-hydroxyphenyl)-1-phenylethane, 1,1-bis(4-hydroxyphenyl)propane, 2,2-bis(2-hydroxyphenyl)propane, 2,2-bis(4-hydroxy-3-methylphenyl)propane, 2,2-bis(4-hydroxy-3,5-dimethylphenyl)propane, 2,2-bis(4-hydroxy-3,5-dibromophenyl)propane, 2,2-bis(3-isopropyl-4-hydroxyphenyl)propane, 2,2-bis(4-hydroxy-3-methylphenyl)propane, 2,2-bis(4-hydroxy-3-phenylphenyl) propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl) pentane, 2,2-bis(4-hydroxyphenyl)-4-methylpentane, 3,3-bis(4-hydroxyphenyl)pentane, 1,1-bis(4-hydroxyphenyl) cyclohexane, 1,1-bis(4-hydroxyphenyl)-3,3,5-trimethylcyclohexane, 9,9-bis(4-hydroxyphenyl)fluorene, 9,9-bis(4-hydroxy-3-methylphenyl)fluorene, bis(4-hydroxyphenyl)sulfide, bis(4-hydroxyphenyl)sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether, hydroquinone, 2-t-butylhydroquinone, resorcin, 4,4'-dihydroxydiphenyl and those having an alkyl group or aryl group as a substituent in the aromatic ring thereof. Out of these, BPA is particularly preferred from an economical point of view. They may be used alone or in combination of two or more.

The one raw material comprising a dihydroxy compound is used in the form of globular particles which include particles having a diameter of 0.1 to 3 mm in an amount of 70 wt % or more and have a specific surface area of 0.05 to 0.2m²/g and a pore volume of 0.01 to 0.1 ml/g. As for particle size, particles having a diameter of 0.1 to 2 mm are contained in an amount of preferably 70 wt % or more, more preferably 80 wt % or more, particularly preferably 90 wt % or more. Further, particles having a diameter of 0.1 mm or less are contained in an amount of preferably 10 wt % or less, more preferably 5 wt % or less, particularly preferably 3 wt % or less.

The specific surface area measured by a BET method is preferably 0.05 to 0.1 m²/g.

The pore volume measured by a mercury penetration method (obtained based on the assumption that a peak at a radius of 100 nm to 600 μm is regarded as a particle pore distribution) is preferably 0.01 to 0.6 ml/g, more preferably 0.01 to 0.4 ml/g, particularly preferably 0.01 to 0.03 ml/g.

An aromatic polycarbonate which is excellent in color and transparency and has small variations can be obtained by using the above one raw material comprising a dihydroxy compound as globular particles having the above particle diameter distribution, specific surface area and pore distribution.

The L and b color values of the above globular particles are preferably 80 or more and 2 or less, more preferably 83 or more and 1.5 or less, much more preferably 85 or more and 1 or less, particularly preferably 85 or more and 0.5 or less, respectively.

The carbonic acid diester is a carbonic acid diester of an aryl group having 6 to 10 carbon atoms, aralkyl group or alkyl group having 1 to 4 carbon atoms, which may be substituted. Specific examples of the carbonic acid diester include diphenyl carbonate, ditolyl carbonate, bis (chlorophenyl)carbonate, m-cresyl carbonate, bis(diphenyl) carbonate, diethyl carbonate and dibutyl carbonate. Out of these, diphenyl carbonate is preferred.

The above other raw material comprising a carbonic acid diester preferably has a small specific surface area and a small pore volume like the above one raw material comprising a dihydroxy compound. However, as the carbonic acid diester has higher stability than the dihydroxy compound, the necessity of controlling the particle size distribution is smaller than the dihydroxy compound. Since the raw material is often supplied as a solution, the necessity of taking into consideration the specific surface area and pore volume is small.

The reason why the above effect is developed when the dihydroxy compound is prepared in the form of globular particles as described above is unknown but it is assumed that quality deteriorating factors are adhered to the surface of each particle and taken into the inside of each pore of the dihydroxy compound, thereby deteriorating the quality of the dihydroxy compound.

In the present invention, in consideration of influence on the durability, color and transparency of a polycarbonate to be produced, it is recommended to use raw materials having a total content of trace metal elements including transition metal elements such as Fe, Cr, Mn, Ni, Pb, Cu and Pd, metal and metalloid elements such as Al and Ti of preferably 50 ppb or less, more preferably 10 ppb or less, in addition to the controlled contents of the above aldehyde group and carboxyl group as impurities.

To obtain an aromatic polycarbonate having higher durability, it is preferred that the one raw material comprising a dihydroxy compound and the other raw material comprising a carbonic acid diester should contain an alkali metal element and/or an alkali earth metal element having large ester exchange capability in an amount of only 60 ppb.

To obtain an aromatic polycarbonate having much higher durability, it is more preferred that the content of an alkali metal element and/or an alkali earth metal element in the aromatic dihydroxy compound and carbonate bond forming precursor should be no more than 60 ppb and that the total content of transition metal elements in the above compound and the precursor should be no more than 10 ppb.

Further, the total content of the above metals and metalloid elements in the both raw materials is preferably no more than 20 ppb.

Although the total content of the transition metal elements, metals and metalloid elements in the raw materials is preferably as small as possible, the limits of the conventional technologies are more than 10 ppb. An aromatic polycarbonate having excellent durability can be obtained by using a dihydroxy compound and a carbonic acid diester having a total content of the above elements of no more than 10 ppb.

In the present invention, to obtain a raw material comprising a dihydroxy compound which has a reduced total content of transition metal, metal and metalloid element impurities and a raw material comprising a carbonic acid diester which has also a reduced total content of the above impurities, known purification methods such as distillation, extraction, recrystallization and sublimation may be employed. It is more preferred to combine the above purification methods.

To obtain a polycarbonate having a low total content of metal impurities in the present invention, a high-purity solvent having an extremely low total content of metal impurities, for example, a solvent for use in the electronic industry is preferably used for the purification of the raw materials.

In the process of the present invention, the above raw materials are used to produce a polycarbonate by melt polycondensing a dihydroxy compound and a carbonic acid diester in the presence of an ester exchange catalyst.

The ester exchange catalyst is preferably a combination of a) at least one basic compound selected from the group consisting of a nitrogen-containing basic compound and a phosphorus-containing basic compound and b) at least one metal compound selected from the group consisting of an alkali metal compound and an alkali earth metal compound.

The alkali metal compound or alkali earth metal compound is, for example, a hydroxide, hydrocarbon compound, carbonate, carboxylate such as acetate, stearate or benzoate, nitrate, nitrite, sulfite, cyanate, thiocyanate, borohydride, hydrogenphosphate, hypophosphite, bisphenol or phenol salt of an alkali metal or alkali earth metal.

Specific examples of the alkali metal compound and alkali earth metal compound include sodium hydroxide, potassium bicarbonate, sodium carbonate, potassium carbonate, cesium carbonate, lithium acetate, rubidium nitrate, lithium nitrate, sodium nitrite, sodium sulfite, sodium cyanate, potassium cyanate, sodium thiocyanate, potassium thiocyanate, cesium thiocyanate, sodium stearate, sodium borohydride, potassium borohydride, lithium borohydride, sodium phenylborate, sodium benzoate, disodium hydrogenphosphate, dipotassium hydrogenphosphate, lithium hypophosphite, sodium hypophosphite, potassium hypophosphite, rubidium hypophosphite, cesium hypophosphite, barium hypophosphite, cesium hypophosphite, disodium salts, monopotassium salts, sodium potassium salts of bisphenol A and potassium salts of phenol.

Out of these, the alkali metal compound is preferably a hypophisphite of an alkali metal and the alkali earth metal compound is preferably a hypophosphite of an alkali earth metal.

The above metal compound is preferably used in an amount of $5 \times 10^{-8}$ to $5 \times 10^{-6}$ equivalent based on 1 mol of the dihydroxy compound.

In the present invention, (a) an alkali metal salt of an ate complex of a group XIV element of the periodic table or (b) an alkali metal salt of an oxoacid of a group XIV element of the periodic table disclosed in JP-A 7-268091 may be used as the above alkali metal compound used as a catalyst. The group XIV element of the periodic table is silicon, germanium or tin.

By using the alkali metal compound as a polycondensation reaction catalyst, a polycondensation reaction can proceed quickly and completely. Also, undesirable side reactions such as a branching reaction which proceeds during a polycondensation reaction can be suppressed to a low level.

At least one compound selected from the group consisting of an oxoacid and oxide of a group XIV element of the periodic table and an alkoxide and phenoxide of the same element may be optionally used as a cocatalyst in combination with the above catalyst in the polycondensation reaction of the present invention.

Undesirable phenomena such as a branching reaction liable to occur during a polycondensation reaction, a main chain cleavage reaction and the generation of foreign matter or burn mark in a molding apparatus during molding can be effectively suppressed without ill-affecting the terminal blocking reaction and polycondensation reaction rate by using the cocatalyst in a specific ratio, which is preferred for the object of the present invention.

Examples of the oxoacid of the group XIV element of the periodic table include silicic acid, stannic acid and germanic acid.

Examples of the oxide of the group XIV element of the periodic table include silicon dioxide, tin dioxide, germanium dioxide, silicon tetramethoxide, silicon tetraphenoxide, tetraethoxy tin, tetranonyloxy tin, tetraphenoxy tin, tetrabutoxy germanium, tetraphenoxy germanium and condensates thereof.

The cocatalyst is preferably used in an amount of 50 molar atoms or less in terms of the group XIV element of the periodic table based on 1 molar atom-of the alkali metal element contained in the polycondensation reaction catalyst. When the cocatalyst is used in an amount of more than 50 molar atoms in terms of the metal element, the polycondensation reaction rate slows down disadvantageously.

The cocatalyst is more preferably used in an amount of 0.1 to 30 molar atoms in terms of the group XIV element of the periodic table as the cocatalyst based on 1 molar atom of the alkali metal element contained in the polycondensation reaction catalyst.

As the catalyst are used a nitrogen-containing basic compound and a phosphorus-containing basic compound. These compounds may be used alone or in combination of two or more.

Examples of the nitrogen-containing basic compound include ammonium hydroxides having an alkyl, aryl or alkylaryl group such as tetramethylammonium hydroxide, tetrabutylammonium hydroxide and benzyltrimethylammonium hydroxide; basic ammonium salts having an alkyl, aryl or alkylaryl group such as tetramethylammonium acetate, tetraethylammonium phenoxide, tetrabutylammonium carbonates and benzyltrimethylammonium benzoates; tertiary amines such as triethylamine and dimethylbenzylamine; and basic salts such as tetramethylammonium borohydride, tetrabutylammonium borohydride and tetramethylammonium tetraphenylborate.

Examples of the phosphorus-containing basic compound include phosphonium hydroxides having an alkyl, aryl or alkylaryl group such as tetrabutylphosphonium hydroxide and benzyltrimethylphosphonium hydroxide; and basic salts such as tetramethylphosphonium borohydride, tetrabutylphosphonium borohydride and tetramethylphosphonium tetraphenylborate.

The above nitrogen-containing basic compound or phosphorus-containing basic compound is preferably used in an amount of $1\times10^{-5}$ to $1\times10^{-3}$ equivalent in terms of the basic nitrogen atom or basic phosphorus atom based on 1 mol of the dihydroxy compound. The amount is more preferably $2\times10^{-5}$ to $5\times10^{-4}$ equivalent, particularly preferably $5\times10^{-5}$ to $5\times10^{-4}$ equivalent based on the same standard.

It has been found that in order to improve the color of the obtained polycarbonate at this point, use of the nitrogen-containing basic compound or phosphorus-containing basic compound in such an amount that it does not exceed $20\times Fe^{*})+200\mu$-equivalent (Fe* (wtppb): the total content of iron contained in the dihydroxy compound and the carbonic acid diester as raw materials) is particularly effective. The amount is particularly preferably such that it does not exceed $20\times(Fe^{*})+150$.

Although the reason is not made clear, it is presumed that the color of a polycarbonate is worsened by interaction between iron contained in the nitrogen-containing basic compound or phosphorus-containing basic compound as a raw material and the nitrogen-containing basic compound and/or phosphorus-containing basic compound. From this point of view, it is preferred to reduce the total content of metal impurities as much as possible.

The melt polymerization process is carried out by stirring a dihydroxy compound and a carbonic acid diester under normal pressure and/or a vacuum nitrogen atmosphere while they are heated and distilling off the formed alcohol or phenol. The reaction temperature, which differs according to the boiling point of the formed product or the like, is generally 120 to 350° C. to remove the alcohol or phenol formed by the reaction.

The formed alcohol or phenol is easily distilled off by placing the system under vacuum in the latter stage of the reaction. The inside pressure of the system in the latter stage of the reaction is preferably 133.3 Pa (1 mmHg) or less, more preferably 66.7 Pa (0.5 mmHg) or less.

In melt polymerization, another copolymerizable compound given below may be optionally incorporated in the main chain of a polycarbonate in addition to the above dihydroxy compound (aromatic dihydroxy compound) and carbonic acid diester.

Examples of the copolymerizable compound include aliphatic and alicyclic diols and polyols such as ethylene glycol, 1,4-butanediol, polyethylene glycol, 1,4-cyclohexane dimethanol, 3,9-bis(1,1-dimethyl-2-hydroxyethyl)-2,4,8,10-tetraoxaspiro[5.5]undecane, tricyclo $(5.2.1.0^{2,6})$decanedimethanol, trimethylolpropane and pentaerythritol; aromatic polyhydroxy compounds such as 1,1,1-tris(4-hydroxyphenyl)ethane and 1,1,2,2-tetrakis(3-methy-4-hydroxyphenyl)ethane; aliphatic and aromatic oxycarboxylic acids such as lactic acid, parahydroxybenzoic acid and 6-hydroxy-2-naphthoic acid; dicarboxylic acids such as succinic acid, fumaric acid, adipic acid, dodecane diacid, terephthalic acid, 2,6-naphthalenedicarboxylic acid, pyromellitic acid and trimellitic acid; and polycarboxylic acids.

To produce a polycarbonate by carrying out a reaction by melt polycondensation, a terminal capping agent and an antioxidant agent such as steric hindrance phenol may be used as required. The polycarbonate of the present invention includes branched polycarbonates prepared by copolymerizing a polyfunctional aromatic compound having a functionality of 3 or more and polyester carbonates prepared by copolymerizing an aromatic or aliphatic bifunctional carboxylic acid. Two or more of the obtained polycarbonates may be mixed together.

The molecular weight of the polycarbonate is preferably 10,000 to 22,000, more preferably 12,000 to 20,000, particularly preferably 13,000 to 18,000 in terms of viscosity average molecular weight (M) as a substrate material. A polycarbonate having the above viscosity average molecular weight has sufficiently high strength as an optical material and excellent melt fluidity at the time of molding and is therefore free from molding strain. For transparent applications such as sheets, the viscosity average molecular weight of the polycarbonate is preferably selected from a range of 17,000 to 100,000, more preferably from a range of 20,000 to 80,000.

According to the present invention, as a polycarbonate particularly suitable for the production of an optical disk substrate, there is provided an aromatic polycarbonate pellet which comprises an aromatic polycarbonate composed mainly of a recurring unit represented by the following formula (2):

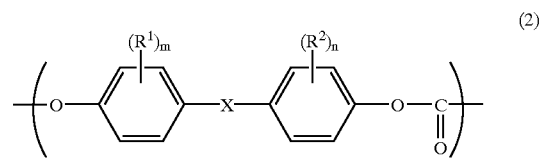

(2)

wherein $R^1$ and $R^2$ are each independently an alkyl group having 1 to 20 carbon atoms, alkoxy group having 1 to 20 carbon atoms, cycloalkyl group having 6 to 20 carbon atoms, aryl group having 6 to 20 carbon atoms, cycloalkoxy group having 6 to 20 carbon atoms or aryloxy group having 6 to 20 carbon atoms, m and n are each independently an integer of 0 to 4, and X is a single bond, oxygen atom, carbonyl group, alkylene group having 1 to 20 carbon atoms, alkylidene group having 2 to 20 carbon atoms, cycloalkylene group having 6 to 20 carbon atoms, cycloalkylidene group having 6 to 20 carbon atoms, arylene group having 6 to 20 carbon atoms or alkylene-arylene-alkylene group having 6 to 20 carbon atoms, and having a viscosity average molecular weight of 10,000 to 17,000 and a value of $1\times10^{-6}$ to $20\times10^{-6}$ obtained by dividing the average value of absorbance at a wavelength of 400 nm and absorbance at a wavelength of 430 nm by absorbance at a wavelength of 260 nm, and which has a b value of −1.0 to 0.0, preferably −0.5 to 0.0 measured in accordance with JIS K7105.

In the present invention, to obtain an aromatic polycarbonate which hardly experiences a reduction in molecular weight and discoloration, attention is paid to the viscosity stability of a molten polymer. The melt viscosity stability is evaluated by the absolute value of a change in melt viscosity measured at a shear rate of 1 rad/sec in a stream of nitrogen at 300° C. for 30 minutes and expressed by a change rate per minute. This value is preferably 0.5% or less. When this value is large, the deterioration of the polycarbonate by hydrolysis may be promoted. The present inventor judges that this value should be set to 0.5% to ensure the practical level of stability to hydrolysis. To this end, the melt viscosity is preferably stabilized by using a melt viscosity stabilizer after polymerization.

The melt viscosity stabilizer in the present invention also has the function of deactivating part or all of the activity of a polymerization catalyst used for the production of a polycarbonate.

As for the addition of the melt viscosity stabilizer, for example, it may be added while the polymer is molten after polymerization or after the polycarbonate is pelletized and re-molten. In the former case, the melt viscosity stabilizer may be added while the polycarbonate which is the reaction product in the reactor or extruder is molten, or may be added and kneaded while the polycarbonate obtained after polymerization is pelletized from the reactor through the extruder.

Any known melt viscosity stabilizer may be used. From the viewpoint of the large effect of improving the color and physical properties such as heat resistance and boiling water resistance of the obtained polymer, sulfonic acid compounds such as organic sulfonic acid salts, organic sulfonic acid esters, organic sulfonic anhydrides and organic sulfonic acid betain may be used, and phosphonium salts of sulfonic acid and/or ammonium salts of sulfonic acid are preferably used. Out of these, dodecylbenzenesulfonic acid tetrabutyl phosphonium salts and paratoluenesulfonic acid tetrabutyl ammonium salts are particularly preferred.

The above aromatic polycarbonate has an aryloxy group and a phenolic hydroxyl group as the main terminal groups and the concentration of the phenolic hydroxyl group is preferably 60 mol % or less, more preferably 40 mol % or less, particularly preferably 30 mol % or less. When the phenolic terminal group is contained in the above weight ratio, the object of the present invention can be more advantageously attained and the moldability of the composition (mold staining properties, releasability; to be simply referred to as "moldability" hereinafter) is also improved.

The aryloxy group is preferably a phenyloxy group having a hydrocarbon group having 1 to 20 carbon atoms as a substituent, or nonsubstituted phenyloxy group. From the viewpoint of resin heat stability, a phenyloxy group having a tertiary alkyl group, tertiary aralkyl group or aryl group as a substituent, or nonsubstituted phenyloxy group is preferred.

Preferred examples of the aryloxy group include phenoxy group, 4-t-butylphenyloxy group, 4-t-amylphenyloxy group, 4-phenylphenyloxy group and 4-cumylphenyloxy group.

In the interfacial polymerization process, the concentration of the terminal phenolic hydroxyl group can be reduced to a low level by means of a molecular weight modifier. However, in the melt polymerization process, the concentration of the terminal hydroxyl group must be reduced positively because an aromatic polycarbonate containing a terminal phenolic hydroxyl group in an amount of generally 50 mol %, sometimes 60 mol % or more is readily produced through a chemical reaction.

That is, the following conventionally known method 1) or 2) can be advantageously used to adjust the concentration of the terminal hydroxyl group to the above range:

1) method of controlling the molar ratio of charge stocks; The molar ratio of the carbonic acid diester to the dihydroxy compound at the time of charging for a polymerization reaction is increased to a range of 1.01 to 1.10 in consideration of the characteristic features of a polymerization reactor.

2) terminal capping method; At the end of a polymerization reaction, the terminal hydroxyl groups are capped by adding a salicylate-based compound described in USP 5696222 in accordance with the method disclosed by the above document.

When the salicylate-based compound is used to cap the terminal hydroxyl groups, the amount of the salicylate-based compound is preferably 0.8 to 10 mols, more preferably 0.8 to 5 mols, particularly preferably 0.9 to 2 mols based on 1 chemical equivalent of the terminal hydroxyl group before a capping reaction. By adding the salicylate-based compound in the above weight ratio, 80% or more of the terminal hydroxyl groups can be capped advantageously. To carry out this capping reaction, catalysts disclosed by the above US patent are preferably used.

The concentration of the terminal hydroxyl group is preferably reduced before the deactivation of a polymerization catalyst.

Salicylate-based compounds enumerated in the specification of U.S. Pat. No. 5,696,222 may be preferably used as the salicylate-based compound, as exemplified by 2-methoxycarbonylphenylaryl carbonates such as 2-methoxycarbonylphenyl-phenyl carbonate; 2-methoxycarbonylphenyl-alkyl carbonates such as 2-methoxycarbonylphenyl-lauryl carbonate; 2-ethoxycarbonylphenyl-aryl carbonates such as 2-ethoxycarbonylphenyl-phenyl carbonate; 2-ethoxycarbonylphenyl-alkyl carbonates such as 2-ethoxycarbonylphenyl-octyl carbonate; (2'-methoxycarbonylphenyl)esters of aromatic carboxylic acids such as (2-methoxycarbonylphenyl)benzoate; and aliphatic carboxylates such as (2-methoxycarbonylphenyl)stearate and bis(2-methoxycarbonylphenyl)adipate.

An aromatic polycarbonate is obtained by the above process. When molded articles are formed from the aromatic polycarbonate, a conventionally known processing stabilizer, heat stabilizer, antioxidant, ultraviolet light absorber, antistatic agent, flame retardant and release agent may be added according to application purpose.

For example, various stabilizers may be blended to prevent a reduction in molecular weight and deterioration in color of an aromatic polycarbonate. Examples of the heat stabilizer include hypophosphorous acid, phosphorous acid, phosphoric acid, phosphonous acid, phosphonic acid, salts and esters thereof, steric hindrance amine antioxidants, steric hindrance phenolic antioxidants and carbon radical scavengers. Trisnonylphenyl phosphate, tris(2,4-di-t-butylphenyl)phosphite, tetrabutylphosphonium dihydrogenphosphates, tetrakis(2,4-di-t-butylphenyl) 4,4'-biphenylenediphosphinate, trimethylphosphate, dimethyl benzenephosphonate, 5,7-di-t-butyl-3-(3,4-dimethylphenyl)-3H-benzofuran-2-one, n-octadecyl 3-(3,5-di-t-butyl-4-hydroxyphenyl)propionate and 2-t-butyl-6-(3-t-butyl-2-hydroxy-5-methylbenzyl)-4-methylphenyl acrylate are preferably used. These heat stabilizers may be used alone or in combination of two or more. The amount of the heat stabilizer is preferably 0.0001 to 1 part by weight, more preferably 0.0002 to 0.5 part by weight, particularly preferably 0.0005 to 0.1 part by weight based on 100 parts by weight of the aromatic polycarbonate.

The aromatic polycarbonate may be mixed with a release agent to further improve releasability from a mold at the time of melt molding. Examples of the release agent include olefin-based wax, olefin-based wax containing a carboxyl group and/or carboxylic acid anhydride group, silicone oil, organopolysiloxane, higher fatty acid ester of a monohydric or polyhydric alcohol, paraffin wax and beeswax. The amount of the release agent is preferably 0.01 to 5 parts by weight based on 100 parts by weight of the aromatic polycarbonate.

The higher fatty acid ester is preferably a partial ester or whole ester of a monohydric or polyhydric alcohol having 1 to 20 carbon atoms and a saturated fatty acid having 10 to 30 carbon atoms. The partial ester or whole ester of a monohydric or polyhydric alcohol and a saturated fatty acid is preferably monoglyceride stearate, triglyceride stearate or pentaerythritol tetrastearate. The amount of the release agent is preferably 0.01 to 5 parts by weight based on 100 parts by weight of the aromatic polycarbonate.

The aromatic polycarbonate may be mixed with inorganic and organic fillers to improve its stiffness. Examples of the inorganic filler include lamellar or granular inorganic fillers such as talc, mica, glass flake, glass bead, calcium carbonate and titanium oxide, and fibrous fillers such as glass fiber, glass milled fiber, wollastonite, carbon fiber, aramide fiber and metal-based conductive fiber, and examples of the organic filler include organic particles such as crosslinked acryl particle and crosslinked silicone particle. The total amount of the inorganic and organic fillers is preferably 1 to 150 parts by weight, more preferably 3 to 100 parts by weight based on 100 parts by weight of the aromatic polycarbonate.

The above inorganic fillers usable in the present invention may be surface treated with a silane coupling agent. A favorable effect such as the suppression of the decomposition of the aromatic polycarbonate is obtained from this surface treatment.

The aromatic polycarbonate may further be blended with another resin.

Examples of the another resin include polyamide resins, polyimide resins, polyether imide resins, polyurethane resins, polyphenylene ether resins, polyphenylene sulfide resins, polysulfone resins, polyolefin resins such as polyethylene and polypropylene, polyester resins such as polyethylene terephthalate and polybutylene terephthalate, amorphous polyarylate resins, polystyrene resins, acrylonitrile/styrene copolymer (AS resin), acrylonitrile/butadiene/styrene copolymer (ABS resin), polymethacrylate resins, phenol resins and epoxy resins.

The aromatic polycarbonate obtained in the present invention has the effect of retaining color and durability, particularly durability for a long time under extreme temperature and humidity conditions. Substrates, obtained from the polymer, for high-density optical disks typified by CD, CD-ROM, CD-R, CD-RW, magnetic optical disks (MO) and disk versatile disks (such as DVD-ROM, DVD-Video, DVD-Audio, DVD-R and DVD-RAM) can retain high reliability for a long time. The aromatic polycarbonate is particularly useful for high-density optical disks such as digital versatile disks.

Sheets formed from the aromatic polycarbonate produced in the present invention are excellent in adhesion and printability and widely used in electric parts, building material parts and auto parts thanks to the above characteristic properties. More specifically, they are useful for optical applications such as various window materials, that is, grazing products for window materials for general houses, gyms, baseball domes and vehicles (such as construction machinery, automobiles, buses, bullet trains and electric vehicles), various side wall panels (such as sky domes, top lights, arcades, wainscots for condominiums and side panels on roads), window materials for vehicles, displays and touch panels for OA equipment, membrane switches, photo covers, polycarbonate resin laminate panels for water tanks, front panels and Fresnel lenses for projection TVs and plasma displays, optical cards, liquid crystal cells consisting of an optical disk and a polarizer, and phase difference compensators. The thickness of the sheet does not need to be particularly limited but it is generally 0.1 to 10 mm, preferably 0.2 to 8 mm, particularly preferably 0.2 to 3 mm. Various treatments for providing new functions (such as a laminate treatment for improving weatherability, a treatment for improving scratch resistance to improve surface hardness, surface drawing and processing for making translucent or opaque) may be carried out on the aromatic polycarbonate sheet.

To mix the above components with the aromatic polycarbonate, any means is employed. For example, a tumbler, twin-cylinder mixer, super mixer, Nauter mixer, Banbury mixer, kneading roll or extruder is advantageously used. The thus obtained aromatic polycarbonate resin composition is melt extruded to form a sheet directly or after it is pelletized by a melt extruder.

In an extrusion step (pelletizing step) for obtaining palletizing polycarbonate resin to be injection molded, foreign matter is preferably removed by passing the polycarbonate through a sintered metal filter having a filtration accuracy of 10 $\mu$m while it is molten. An additive such as a phosphorus-based antioxidant is preferably added as required. Anyway, it is desired to reduce the contents of foreign matter, impurities and solvent in the raw material resin as much as possible before injection molding.

To produce an optical disk substrate from the above polycarbonate resin, an injection molding machine (including an injection compression molding machine) is used. This injection molding machine may be a generally used injection molding machine but preferably an injection molding machine whose cylinders and screws are made from a material having low adhesion to a resin and corrosion resistance and wearing properties in order to suppress the formation of a carbide and improve the reliability of a disk substrate. The preferred injection molding conditions include a cylinder temperature of 300 to 400° C. and a mold temperature of 50 to 140° C., thereby making it possible to obtain an optical disk substrate having excellent optical properties. The molding environment is preferably as clean as possible in consideration of the object of the present invention. It is also important that the material to be molded should be completely dried to remove its water and that retention which causes the decomposition of a molten resin should be prevented.

The aromatic polycarbonate produced in the present invention may be used for any purpose, for example, electronic and communication equipment, OA equipment, optical parts such as lenses, prisms, optical disk substrates and optical fibers, electronic and electric appliances such as home electric appliances, lighting members and heavy electric members, mechanical materials such as car interior and exterior parts, precision machines and insulating materials, miscellaneous materials such as medical materials, safety and protective materials, sports and leisure outfits, and home supplies, container and package materials, and display and decoration materials. They may also be advantageously used as a composite material with another resin, or organic or inorganic material.

EXAMPLES

The following examples are provided for the purpose of further illustrating the present invention but are in no way to be taken as limiting.

"Parts" in the examples means "parts by weight".

Analytical Method

Methods for testing aromatic polycarbonates produced in Examples and Comparative Examples are given below.

1) viscosity average molecular weight (Mw): The viscosity of a solution of 350 mg of a sample dissolved in 50 ml of methylene chloride was measured with an Ubbellohde viscometer at 20° C. to obtain an intrinsic viscosity ([$\eta$]) and the viscosity average molecular weight was obtained from this intrinsic viscosity according to the following expression.

$[\eta]=1.23\times10^{-4}\times Mw^{0.83}$ 2) method of measuring the total content of metal impurities device; ICP-MS SPQ 9000 of Seiko Instruments Co., Ltd.

sample concentration; 0.5 g of a sample was dissolved in 25 g of high-purity isopropyl alcohol for use in the electronic industry and measured to determine the total content of metal impurities from a standard sample calibration curve.

3) melt viscosity stability

The absolute value of a change in melt viscosity was measured at a shear rate of 1 rad/sec and a temperature of 300° C. in a stream of nitrogen with the RAA type fluidity analyzer of Rheometrics Co., Ltd. for 30 minutes to obtain a change rate per minute as melt viscosity stability. This value does not exceed 0.5% when the aromatic polycarbonate is stable for a long time.

4) determination of the amount of aldehyde

This was measured by the high-speed liquid chromatography of an aliphatic aldehyde using fluorescent derivation with cyclohexane-1,3-dione (to be abbreviated as DHA hereinafter) in accordance with a method described in BUN-SEKI KAGAKU Vol. 34, pp. 314 to 318. A predetermine amount of a derivative of acetaldehyde and DHA was used as a reference material for the determination of the amount of the formed aldehyde.

Thereafter, about 0.1 g of a sample was weighed, and 2 ml of a DHA derivation reagent solution described in the above document was added to the sample and reacted at 60° C. for 30 minutes to change aldehydes contained in the sample to DHA derivatives. The 440 nm fluorescent intensity of the sample was compared with the 440 nm fluorescent intensity. of the reference material, and all the aldehydes contained in the sample were regarded as acetaldehyde and determined quantitatively as the amount of an aldehyde functional group (equivalent/1 mol of dihydroxy compound or 1 mol of carbonic acid diester compound).

The detection of an aldehyde by this method is possible even when the amount of an aldehyde functional group is 0.03 ppm as described in the analytical example of the above document.

5) determination of the content of carboxyl group: measured by ion chromatography About 5 g of a sample was weighed and placed in a polyethylene container with a cover, 20 ml of pure water was added, the container was covered, and extraction was carried out at 80° C. for 16 hours. Then, the extract was treated with ultrasonic waves for 30 minutes and filtered with a 0.45 $\mu$m membrane filter for ion chromatography to obtain a measurement solution. This solution was analyzed by ion chromatography.

The analytical value of a solution which did not contain the sample and was subjected to the same treatment as above was taken as a blank value.

Measurement Conditions

Column: IonpacAG4A-SC/AS4A-SC

Elute: 1.80 mM $Na_2CO_3$+1.70 mM $NaHCO_3$

Regenerated solution: 0.025N $H_2SO_4$

Detector: electric conductivity

Flow rate: 1.5 ml/min

Suppressor: micro-membrane suppressor 6) measurement of color; L and b values

A) polymer pellet:

Polymer pellets having a weight of 10 to 100 mg/pellet were measured with the Z-1001 DP color difference meter of Nippon Denshoku Co., Ltd. in accordance with JIS K7105.

B) color of bisphenol A prill:

Measured with the Z-1001 DP color difference meter of Nippon Denshoku Co., Ltd. like the polymer pellet.

7) color durability of polymer pellet

To test the durability of a polycarbonate under extreme temperature and humidity conditions, a sample obtained by dividing the above polycarbonate pellet into 10 pieces was held in a thermo-hygrostat at a temperature of 80° C. and a relative humidity of 85% for 1,000 hours to measure the color b value of the polymer.

The absolute values of differences between the maximum values and the minimum values of 10 polymer samples after the durability test were taken as $\Delta$bMax-Min which is a polymer color variation.

The color stability $\Delta$b was obtained from the absolute value of difference in color b value before and after the durability test.

As these values are smaller, the color durability of a polymer pellet becomes higher. When these values were 0.5 or less, it was judged that the polymer had desirable color durability even when it was used under extreme temperature and humidity conditions for a long time. A polymer having values larger than 1 was evaluated as unfavorable.

8) determination of concentration (mol %) of phenolic OH terminal group, number (equivalent/ton-PC) of phenolic OH terminal groups, concentration (mol %) of aryloxy terminal group, number (equivalent/ton-PC) of aryloxy terminal groups About 0.02 g of a polymer sample was dissolved in 0.4 ml of heavy chloroform and the concentration (mol %) of the phenolic OH terminal group based on the total of all the terminal groups and the number (equivalent/ton-PC) of phenolic OH terminal groups were measured by a $^1$H-NMR measuring instrument (EX-270 of JEOL Ltd.) at 20° C.

The concentration (mol %) of the aryloxy terminal group was obtained from the concentration (mol %) of the 100-phenolic OH terminal group and the number (equivalent/ton-PC) of aryloxy terminal groups was calculated as a difference between the total number of all the terminal groups obtained from the following equation and the number of phenolic OH terminal groups.

$$\text{total number of all terminal groups (equivalent/ton-PC)} = 56.54/[\eta]^{1.4338}$$

9) amount of side-reaction of polymer

It was judged that a peak other than the peak of a polycarbonate seen at $\delta$ of 0 to 10 by $^1$H-NMR measurement was derived from a side-reaction product such as a decomposed product or branched product which was formed during polymerization. The ratio of an integrated value of 1,024 peak intensities to the peak intensity of a polycarbonate methyl group was measured and when this value was $1.0 \times 10^{-2}$ or more, it was judged that the amount of a side-reaction of polymer was large.

10) purification examples of raw materials a) Purification of bisphenol A (may be abbreviated as BPA hereinafter)

a)-1 Commercially available bisphenol A (before purification; GB) was fed to a pressure vessel equipped with a decompressor and cooler and purified by sublimation at a pressure of 13.3 Pa (0.1 Torr) or less and a temperature of 140° C. under a nitrogen atmosphere.

The sublimation purification was repeated three times to obtain purified bisphenol A (cB) and the sublimation purification was repeated four times to obtain purified bisphenol A (dB).

a)-2 hydrogenation 100 parts by weight of the above purified bisphenol A (cB) was dissolved in 1,000 parts by weight of high-purity methanol for use in the electronic industry, the resulting solution was fed to an autoclave equipped with a stirrer, and 1 part by weight of 1 wt % of a palladium carried on activated carbon was fed to the autoclave as a hydrogenation catalyst to carry out a reaction at a hydrogen pressure of 1.0 atm (0.1 MPa) and a temperature of 50° C. for 5 hours. After the reaction, the catalyst was separated and the solvent was removed under vacuum to obtain purified bisphenol A (eB).

This purified bisphenol A (eB) was purified by sublimation under the above conditions to obtain purified bisphenol A (fB).

The purities of the raw and purified bisphenol A are shown in Table 1.

described in "Plastic Material Lecture 17 Polycarbonate, pp. 45" written by Toshihisa Tachikawa and published by Nikkan Kogyo Shinbun Co., Ltd. to collect a fraction. The obtained distilled DPC was fed to a pressure vessel equipped with a decompressor and cooler to carry out sublimation purification once at 13.3 Pa (0.1 Torr) or less and 80° C. under a nitrogen atmosphere to obtain purified DPC (bD).

b)-2 hydrogenation 100 parts by weight of the distilled DPC was dissolved in 500 parts by weight of high-purity tetrahydrofuran for use in

TABLE 1

| | | BPA impurities | | | | | | | | | | | | | |
| --- | --- | --- | --- | --- | --- | --- | --- | --- | --- | --- | --- | --- | --- | --- | --- |
| | | aldehyde μ-equivalent/ | carboxylic acid μ-equivalent/ | metal impurities (ppb) | | | | | | | | | | | |
| Type of BPA | symbol | 1-mol of BPA | 1-mol of BPA | Na | Fe | Cr | Mn | Ni | Pb | Cu | Zn | Pd | In | Si | Al | Ti |
| raw BPA | GB | 12 | 8 | 86 | 60 | 5 | 4 | 8 | 5 | 1* | 11 | 1* | 7 | 25 | 22 | 1* |
| 3 times of purification by sublimation | cB | 7 | 6 | 5 | 15 | 1* | 1* | 1* | 1* | 1* | 1* | 1* | 1* | 2 | 1* | 1* |
| 4 times of purification by sublimation | dB | 5 | 6 | 5 | 8 | 1* | 1* | 1* | 1* | 1* | 1* | 1* | 1* | 1* | 1* | 1* |
| cB + hydrogenation | eB | 1 or less | 3 | 7 | 10 | 1* | 1* | 1* | 1* | 1* | 1* | 1* | 1* | 1* | 1* | 1* |
| eB + sublimation (hydrogenation) | fB | 1 or less | 2 | 6 | 8 | 1* | 1* | 1* | 1* | 1* | 1* | 1* | 1* | 1 | 1 | 1* |

1*: 1ppb or less a)-3 treatment of bisphenol A with hypophosphorous acid derivative 100 parts by weight of purified bisphenol A (fB) was immersed in 2,000 parts by weight of a 3 wt % aqueous solution of hypophosphorous acid or a 1 wt % aqueous solution of sodium hypophosphite at 25° C. for 10 hours. Bisphenol A was separated and washed with 2,000 parts by weight of distilled water at 98° C. under a nitrogen gas atmosphere for 5 hours. The obtained bisphenol A was washed five times in total and vacuum dried to obtain purified bisphenol A (fB*) and purified bisphenol A (fB**).

the electronic industry, the resulting solution was fed to an autoclave equipped with a stirrer, and 1 part by weight of 1 wt % of a palladium carried on activated carbon was fed as a hydrogenation catalyst to carry out a reaction at a hydrogen pressure of 1.0 atm (0.1 MPa) and a temperature of 50° C. for 5 hours. The catalyst was separated after the reaction and the solvent was removed under vacuum to collect DPC. The obtained DPC was further purified by sublimation one more time as described above to obtain purified DPC (cD).

The purities of the raw and purified DPC are shown in Table 2.

TABLE 2

| | | DPC impurities | | | | | | | | | | | | | |
| --- | --- | --- | --- | --- | --- | --- | --- | --- | --- | --- | --- | --- | --- | --- | --- |
| | | aldehyde μ-equivalent/ | carboxylic acid μ-equivalent/ | metal impurities (ppb) | | | | | | | | | | | |
| Type of DPC | symbol | 1-mol of BPA | 1-mol of BPA | Na | Fe | Cr | Mn | Ni | Pb | Cu | Zn | Pd | In | Si | Al | Ti |
| raw DPC | GD | 7 | 5 | 96 | 40 | 15 | 5 | 5 | 1 | 1* | 11 | 1* | 15 | 15 | 42 | 3* |
| Washing with water/ distillation/ sublimation × one time | bD | 4 | 3 | 10 | 9 | 1* | 1* | 1* | 1* | 1* | 1* | 1* | 1* | 2 | 1* | 1* |
| Hydrogenated DPC (bD) | cD | 1 or less | 1 or less | 10 | 9 | 1* | 1* | 1* | 1* | 1* | 1* | 1* | 1* | 2 | 1 | 1* |

1*: 1ppb or less b) purification of diphenyl carbonate (may be abbreviated as DPC hereinafter)

b)-1 Distilled DPC was obtained by cleaning raw DPC (GD) with hot water (50° C.) three times, drying and carrying out vacuum distillation at 167 to 168° C. and 2.00 kPa (15 mmHg) in accordance with the method 11) molding of bisphenol A prill a) Purified bisphenol A (fB) was molten by heating at 170° C. under a nitrogen atmosphere and flown and dropped from a nozzle having a radius of 0.3 mm to form droplets which were then contacted to 77K cooling nitrogen gas countercurrently to be cooled at a rate of 100° C./sec or more. Prills as large as 0.2 mm or less and 3 mm or more were removed by screening to obtain prills having an average particle diameter of 1.5 mm (fB-a).

b) Molten bisphenol A (fB) was flown and dropped from a nozzle having a radius of 0.5 mm in place of the above nozzle having a radius of 0.3 mm to form droplets which were then contacted to 77K cooling nitrogen gas countercurrently to be cooled at a rate of 100° C./sec or more. Prills having a diameter of 0.2 mm or less and 3 mm or more were removed by screening to obtain prills having an average particle diameter of 1.5 mm (fB-b).

c) Cooling was carried out at a rate of 100° C./sec or less in the same manner as the prills (fB-b) except that droplets were contacted to 0° C. cooling nitrogen countercurrently and prills having a diameter of 0.2 mm or less and 3 mm or more were removed by screening to obtain prills having an average particle diameter of 1.5 mm (fB-c). The results are shown in Table 3.

12) specific surface area (m²/g)

This was measured by a BET specific surface area measuring method.

Device: BELSORP 36 high-accuracy fully automatic gas adsorber of Nippon Bell Co., Ltd.

Adsorption gas: Kr

Dead volume: He

Adsorption temperature: liquid nitrogen temperature (77K)

Pre-treatment before measurement: 50° C., vacuum deaeration (ultimate vacuum degree: up to 1 Pa)

Measurement mode: adsorption at isotherm

Measurement range: relative pressure (P/PO)=0.01 to 0.4

Equilibrium time=180 sec at each relative pressure

Measurement: About 0.2 to 0.5 g of a sample was weighed by the AEL200 electronic balance of Shimadzu Corporation, enclosed in a sample tube and measured, BET theory was applied, and analysis was made at a relative pressure (P/P0) of 0.05 to 0.30 where the theory was valid and a BET plot became a straight line to calculate specific surface area(m²/g). The results are shown in Table 3.

13) pore volume (ml/g)

9320 pore sizer of Micromeritecs Co., Ltd.

measurement pressure: 0.37 kPa to 207 MPa (pore diameter of 7 nm to 400 μm)

measurement mode: pressure rise within the above pressure range cell volume: 5 cm³ number of measurement times: 1 and 2 measurement: 0.2 to 1.2 g of a sample was weighed and placed in a cell, and mercury was injected into the cell under reduced pressure to obtain pore volume at a pore radius of 100 nm to 6 μm in consideration of the deformation of sample particles and the interval between particles. The results are shown in Table 3.

TABLE 3

| type of BPA prill | raw BPA | prill forming conditions | average particle diameter mm | wt % of particles having a size of 0.1 to 3 mm | specific surface area m²/g | surface area of pore ml/g | color L value | b value |
|---|---|---|---|---|---|---|---|---|
| GB-0 | Commercially available BPA | GB | | 2.7 | 97 | 0.25 | 0.14 | 81 | 2.1 |
| fB-a | Purified BPA | fB | (a) | 1.5 | 100 | 0.09 | 0.03 | 87 | 0.1 |
| fB-b | | | (b) | 2.2 | 100 | 0.12 | 0.05 | 87 | 0.5 |
| fB-c | | | (c) | 2.3 | 100 | 0.21 | 0.11 | 86 | 1.5 |
| fB-0 (fB) | | | no conditions | powder | 70 wt % or less | 0.23 | 0.12 | 78 | 1.4 |

14) spectral stability

Measurement of Ultraviolet/visible Light Absorption Spectrum measurement device: UV-2400PC of Shimadzu Corporation measurement cell: quartz cell having an optical path length (1) of 1 cm measurement: About 0.73 g of a polycarbonate was weighed and dissolved in 10 ml of methylene chloride (sample A).

A solution (sample B) was prepared by diluting the sample A with methylene chloride in a ratio of 1/10 and a sample (sample C) was prepared by diluting the sample A with methylene chloride in a ratio of 1/100.

Reference: solvent (methylene chloride)

The absorbance (A) was measured at a wavelength of 290 to 500 nm for the sample A, 275 to 275 nm for the sample B and 200 to 300 nm for the sample C and the absorption coefficient (E) was calculated from the equation $A = \epsilon \times C \times 1$ (C: concentration of polymer, 1: optical path length).

A value obtained by dividing the average value $\epsilon 4$ of an absorption coefficient $\epsilon 2$ at a wavelength of 400 nm and an absorption coefficient $\epsilon 3$ at a wavelength of 430 nm by an absorption peak absorbance $\epsilon 1$ derived from a benzene ring at a wavelength of 260 nm was taken as spectral stability.

When this value is larger than $20 \times 10^{-6}$, the color b value of a polymer is bad and the color durability thereof is also poor. The spectral stability is preferably $7 \times 10^{-6}$ or less.

Example 1

A polycarbonate was produced as follows. 137 parts by weight of the above purified bisphenol A (fB) shown in Table 1 and 135 parts by weight of the above purified DPC (cD) shown in Table 2 were fed to a reactor equipped with a stirrer, fractionating column and decompressor and molten at 180° C. under a nitrogen atmosphere. After dissolution, $5.3 \times 10^{-5}$ part by weight of sodium hypophosphite A1 and $5.46 \times 10^{-3}$ part by weight of tetramethylammonium hydroxide (B1) were added as catalysts shown in Table 4 to carry out a reaction under agitation at a revolution speed of 40 rpm for 20 minutes while the formed phenol was distilled off by reducing the inside pressure of the reactor to 13.33 kPa (100 mmHg). After the temperature was raised to 200° C., the pressure was gradually reduced to 4.000 kPa (30 mmHg) while the phenol was distilled off, and the reaction was further continued for 20 minutes. By gradually increasing the temperature, the reaction was further carried out at 220° C. for 20 minutes and 240° C. for 20 minutes. The temperature of the reaction mixture was raised to 260° C., the reaction was carried out at the same temperature for 20 minutes, the temperature was further raised to 270° C., and the reaction was continued by gradually reducing the pressure to 2.666 kPa (20 mmHg) for 10 minutes and at 1.333 kPa (10 mmHg) at a revolution speed of 30 rpm. When the viscosity average molecular weight became almost 8,000, the revolution speed was changed to 20 rpm and the reaction was continued until the viscosity average molecular weight at 270° C. and 66.7 kPa (0.5 mmHg) became almost 15,300.

Subsequently, $4.12 \times 10^{-4}$ part by weight of tetrabutylphosphonium 2,4,6-trimethylbenzenesulfonate (may be abbreviated as TMBSP hereinafter) was added as a melt viscosity stabilizer was added and stirred at 260° C. and 66.7 kPa (0.5 mmHg) for 10 minutes. Finally, a polycarbonate having a viscosity average molecular weight of 15,400, 85 OH terminal groups (eq/ton-polycarbonate) and a melt viscosity stability of 0 was obtained.

The results including other physical properties are shown in Table 4.

Comparative Examples 1 to 4

Polycarbonates were obtained in the same manner as in Example 1 except that bisphenol A, DPC, catalysts and melt viscosity stabilizer shown in Table 4 were used. Finally, polycarbonates shown in Table 5 were obtained. The results including other physical properties are shown in Table 4 and Table 5.

Examples 2 to 14

Polycarbonates were produced in the same manner as in Example 1 except that bisphenol A, DPC, catalysts and melt viscosity stabilizer shown in Table 4 were used. The results are shown in Table 4.

Not described individually, according to the experimental results of Examples 2 to 14, the number of OH terminal groups was 85±3 (eq/ton-polycarbonate) and the melt viscosity stability was 0.

The color of a polycarbonate having a viscosity average molecular weight of 20,000 or less is strictly evaluated by its b value. Therefore, in the present invention which is aimed to produce a polycarbonate having excellent color, when a polymer pellet has a color b value of more than 0.1, it is tinted with yellow and therefore judged as unacceptable. When a polymer pellet has a b value of less than 0.1, it is little tinted with yellow and therefore judged as acceptable. As understood from the results, when DPC and bisphenol A whose aldehyde contents were reduced to 0.3 $\mu$-equivalent/bisphenol A and DPC compared with a conventional raw material were used as polymerization raw materials, it was judged that the obtained polycarbonate pellet had excellent color with a small negative b value and little yellow tint.

Example 15

Comparative Example 5

Polymerization was continued until the viscosity average molecular weight became 22,500 in Example 1 and Comparative Example 2, and 2.1 parts by weight of 2-methoxycarbonylphenylphenyl carbonate (maybe abbreviated as SAM hereinafter) was added as a terminal capping agent at this point and stirred at 260° C. and 133.3 Pa (1 mmHg) for 10 minutes. Thereafter, $5.26 \times 10^{-4}$ part by weight of DBSP was added as a melt viscosity stabilizer and stirred at 260° C. and 66.7 Pa (0.5 mmHg) for 10 minutes. Finally, a polycarbonate having a viscosity average molecular weight of 22,600, 30 terminal OH groups (eq/ton-polycarbonate) and a melt viscosity stability of 0 and a polycarbonate having a viscosity average molecular weight of 22,500, 32 terminal OH groups (eq/ton-polycarbonate) and a melt viscosity stability of 0 were obtained.

The results including other physical properties are shown in Table 4.

TABLE 4

|  | Ex. 1 | C. Ex. 1 | C. Ex. 2 | C. Ex. 3 | C. Ex. 4 |
|---|---|---|---|---|---|
| Type of DPC | cD | GD | bD | bD | cD |
| Type of BPA | fB | GB | dB | eB | dB |
| Catalyst Alkali metal catalyst |  |  |  |  |  |
| type | A1 | A1 | A1 | A1 | A1 |
| amount ($\times 10^{-5}$ part by weight) | 5.3 | 5.3 | 5.3 | 5.3 | 5.3 |
| ($\mu$mol/BPA) | 1 | 1 | 1 | 1 | 1 |
| basic compound |  |  |  |  |  |
| type | B1 | B1 | B1 | B1 | B1 |
| amount ($\times 10^{-3}$ part by weight) | 5.46 | 5.46 | 5.46 | 5.46 | 5.46 |
| ($\mu$mol/BPA) | 100 | 100 | 100 | 100 | 100 |
| melt viscosity stabilizer |  |  |  |  |  |
| type | TMBSP | TMBSP | TMBSP | TMBSP | TMBSP |
| amount ($\times 10^{-4}$ part by weight) | 4.12 | 4.12 | 4.12 | 4.12 | 4.12 |
| physical properties |  |  |  |  |  |
| viscosity average molecular weight | 15,400 | 15,300 | 15,500 | 15,200 | 15,200 |
| color (pellet L value) | 65 | 64 | 64 | 64 | 64 |
| color (pellet b value) | −0.6 | 2.5 | 1.6 | 0.6 | 0.6 |
| side reactivity ($\times 10^{-2}$) | 0.1 or less | 2.8 | 2.2 | 1.5 | 2,1 |

TABLE 4-continued

|  | Ex. 2 | Ex. 3 | Ex. 4 | Ex. 5 | Ex. 6 |
|---|---|---|---|---|---|
| Type of DPC | cD | cD | cD | cD | cD |
| Type of BPA | eB | eB | eB | eB | eB |
| Catalyst Alkali metal catalyst | | | | | |
| type | A1 | A2 | A3 | A4 | A6 |
| amount ($\times 10^{-5}$ part by weight) | 5.3 | 1.7 | 4.9 | 3.4 | 1.6 |
| ($\mu$mol/BPA) | 1 | 0.7 | 0.7 | 0.7 | 0.7 |
| basic compound | | | | | |
| type | B1 | B3 | B4 | B4 | B5 |
| amount ($\times 10^{-3}$ part by weight) | 5.46 | 47.9 | 38.9 | 38.9 | 10.9 |
| ($\mu$mol/BPA) | 100 | 200 | 200 | 200 | 200 |
| melt viscosity stabilizer | | | | | |
| type | TMBSP | BSP | BSP | BSP | BSP |
| amount ($\times 10^{-4}$ part by weight) | 4.12 | 3.74 | 3.74 | 3.74 | 3.74 |
| physical properties | | | | | |
| viscosity average molecular weight | 15,300 | 15,400 | 15,300 | 15,200 | 15,300 |
| color (pellet L value) | 65 | 65 | 65 | 65 | 65 |
| color (pellet b value) | −0.2 | −0.4 | −0.3 | −0.4 | −0.3 |
| side reactivity ($\times 10^{-2}$) | 0.3 | 0.2 | 0.1 | 0.2 | 0.2 |

|  | Ex. 7 | Ex. 8 | Ex. 9 | Ex. 10 | Ex. 11 |
|---|---|---|---|---|---|
| Type of DPC | cD | cD | cD | cD | cD |
| Type of BPA | fB | fB | fB | fB | fB |
| Catalyst Alkali metal catalyst | | | | | |
| type | A8 | A8 | A8 | A8 | A6 |
| amount ($\times 10^{-5}$ part by weight) | 4.5 | 6.3 | 9 | 18 | 1.6 |
| ($\mu$mol/BPA) | 0.5 | 0.7 | 1.0 | 2.0 | 0.7 |
| basic compound | | | | | |
| type | B2 | B2 | B2 | B2 | B2 |
| amount ($\times 10^{-3}$ part by weight) | 7.8 | 7.8 | 7.8 | 7.8 | 16.5 |
| ($\mu$mol/BPA) | 50 | 50 | 50 | 50 | 100 |
| melt viscosity stabilizer | | | | | |
| type | DBSP | DBSP | DBSP | DBSP | SABP |
| amount ($\times 10^{-4}$ part by weight) | 2.63 | 3.68 | 5.26 | 10.52 | 2.58 |
| physical properties | | | | | |
| viscosity average molecular weight | 15,200 | 15,300 | 15,400 | 15,300 | 15,300 |
| color (pellet L value) | 64 | 65 | 65 | 64 | 65 |
| color (pellet b value) | −0.5 | −0.6 | −0.6 | −0.4 | −0.5 |
| side reactivity ($\times 10^{-2}$) | 0.1 | 0.1 or less | 0.1 or less | 0.1 | 0.1 or less |

|  | Ex. 12 | Ex. 13 | Ex. 14 | Ex. 15 | C. Ex. 5 |
|---|---|---|---|---|---|
| Type of DPC | cD | cD | cD | cD | bD |
| Type of BPA | fB | fB | fB | fB | dB |
| Catalyst Alkali metal catalyst | | | | | |
| type | A1 | A2 | A3 | A1 | A1 |
| amount ($\times 10^{-5}$ part by weight) | 3.7 | 1.7 | 4.9 | 5.3 | 5.3 |
| ($\mu$mol/BPA) | 0.7 | 0.7 | 0.7 | 1 | 1 |
| basic compound | | | | | |
| type | B3 | B4 | B1 | B1 | B1 |
| amount ($\times 10^{-3}$ part by weight) | 23.9 | 19.4 | 5.46 | 5.46 | 5.46 |
| ($\mu$mol/BPA) | 100 | 100 | 100 | 100 | 100 |
| melt viscosity stabilizer | | | | | |
| type | SABP | SABP | SABP | DBSP | DBSP |
| amount ($\times 10^{-4}$ part by weight) | 2.58 | 2.58 | 2.58 | 5.26 | 5.26 |
| physical properties | | | | | |
| viscosity average molecular weight | 15,200 | 15,300 | 15,400 | 22,600 | 22,500 |
| color (pellet L value) | 64 | 65 | 64 | 65 | 64 |
| color (pellet b value) | −0.5 | −0.5 | −0.5 | 0.5 | 1.0 |
| side reactivity ($\times 10^{-2}$) | 0.1 or less | 0.1 or less | 0.1 or less | 0.1 | 1.2 |

Ex.: Example
C. Ex.: Comparative Example

Alkali Metal Catalysts
A1: sodium hypophosphite, A2: sodium hydroxide, A3: sodium phenoxide, A4: sodium acetate, A5: potassium stearate, A6: sodium borohydride, A7: disodium salt of bisphenol A, A8: cesium hydroxide, A9: potassium hypophosphite, A10: lithium hypophosphite Basic Compounds
B1: tetramethylammonium hydroxide, B2: tetrabutylphosphonium hydroxide, B3: tetramethylammonium tetraphenyl borate, B4: tetrabutylphosphonium hypophosphite, B5: tetrabutylphosphonium hypophosphite, B6: tetramethylammonium hypophosphite, B7: tetrabutylammonium hypophosphite Melt Viscosity Stabilizers
DBSP: tetrabutylphosphonium dodecylbenzensulfonate, TMBSP: tetrabutylphosphonium 2,4,6-trimethylbenzenesulfonate, BSP: tetramethylphosphonium benzenesulfonate, SABP: bis(tetrabutylphosphonium) sulfate

TABLE 5

| Example | viscosity average molecular weight | number of OH terminal groups eq/ton-PC | melt viscosity stability |
|---|---|---|---|
| C. Ex. 1 | 15,300 | 85 | 0 |
| C. Ex. 2 | 15,500 | 84 | 0 |
| C. Ex. 3 | 15,200 | 86 | 0 |
| C. Ex. 4 | 15,200 | 85 | 0 |

C. Ex.: Comparative Example

Examples 16 to 22

Polycarbonates were obtained in the same manner as in Example 1 except that DPC, bisphenol A, catalysts and melt viscosity stabilizer shown in Table 6 were used. The results are shown in Table 6.

Not described individually, according to the experimental results of Examples 16 to 22, the number of OH terminal groups was 85±3 (eq/ton-PC) and the melt viscosity stability was 0.

As for the color b value of a polycarbonate having a viscosity average molecular weight of 20,000 or less, when DPC and bisphenol A whose aldehyde contents were reduced to 0.3 $\mu$-equivalent/bisphenol A and DPC were used as polymerization raw materials and a hypophosphorous acid compound was used as a polymerization catalyst, it was judged that the obtained polycarbonate pellets had a much improved b value and were suitable for optical applications which require transparency and strict color compared with polycarbonate pellets obtained from conventional raw materials as understood from the results of Table 5. It is easily understood that when bisphenol A treated with a hypophosphorous acid compound is used, a more excellent color is provided.

When the polycarbonate having excellent color is used for optical application, its excellent color is developed more advantageously.

Examples 23 and 24

Polymerization was continued until the viscosity average molecular weight became 22,500 in the same manner as in Except 1 except that DPC, bisphenol A, catalysts and melt viscosity stabilizer shown in Table 6 were used. 2.1 parts by weight of 2-methoxycarbonylphenylphenyl carbonate (may be abbreviated as SAM hereinafter) was added as a terminal capping agent at this point and stirred at 260° C. and 133.3 Pa (1 mmHg) for 10 minutes. Thereafter, 5.26×10$^{-4}$ part by weight of DBSP was added as a melt viscosity stabilizer and stirred at 260° C. and 66.7 Pa (0.5 mmHg) for 10 minutes. Finally, a polycarbonate having a viscosity average molecular weight of 22,500, 30 terminal OH groups (eq/ton-polycarbonate) and a melt viscosity stability of 0 and a polycarbonate having a viscosity average molecular weight of 22,600, 32 terminal OH groups (eq/ton-polycarbonate) and a melt viscosity stability of 0 were obtained.

The results including other physical properties are shown in Table 6.

TABLE 6

| | Ex. 16 | Ex. 17 | Ex. 18 | Ex. 19 | Ex. 20 |
|---|---|---|---|---|---|
| Type of DPC | cD | cD | cD | cD | cD |
| Type of BPA | fB | fB | fB | fB | fB |
| Catalyst Alkali metal catalyst | | | | | |
| type | A8 | A9 | A10 | A9 | A10 |
| amount (× 10$^{-5}$ part by weight) | 6.3 | 3.1 | 4.3 | 4.4 | 4.4 |
| ($\mu$mol/BPA) | 0.7 | 0.5 | 1 | 0.7 | 1 |
| basic compound | | | | | |
| type | B2 | TBAH | B2 | B5 | B6 |
| amount (× 10$^{-3}$ part by weight) | 7.8 | 12.4 | 24.8 | 19.4 | 13.8 |
| ($\mu$mol/BPA) | 50 | 80 | 150 | 100 | 100 |
| melt viscosity stabilizer | | | | | |
| type | DBSP | DBSP | DBSP | DBSP | DBSP |
| amount (× 10$^{-4}$ part by weight) | 3.68 | 2.5 | 5.3 | 3.7 | 5.3 |
| physical properties | | | | | |
| viscosity average molecular weight | 13,200 | 15,400 | 15,300 | 15,500 | 15,400 |
| color (pellet L value) | 65 | 65 | 65 | 65 | 64 |
| color (pellet b value) | −0.6 | −0.9 | −0.9 | −0.9 | −0.9 |
| side reactivity (× 10$^{-2}$) | 0.1 or less | 0.1 or less | 0.1 or less | 0.1 or less | 0.1 or less |

TABLE 6-continued

|  | Ex. 21 | Ex. 22 | Ex. 23 | Ex. 24 |
|---|---|---|---|---|
| Type of DPC | cD | cD | cD | cD |
| Type of BPA | fB* | fB** | fB** | fB |
| Catalyst Alkali metal catalyst | | | | |
| type | A1 | A1 | A1 | A2 |
| amount ($\times 10^{-5}$ part by weight) | 5.3 | 5.3 | 5.3 | 2.4 |
| ($\mu$mol/BPA) | 1 | 1 | 1 | 1 |
| basic compound | | | | |
| type | B6 | B7 | B6 | B1 |
| amount ($\times 10^{-3}$ part by weight) | 13.8 | 18.4 | 13.8 | 5.5 |
| ($\mu$mol/BPA) | 100 | 100 | 100 | 100 |
| melt viscosity stabilizer | | | | |
| type | DBSP | DBSP | DBSP | DBSP |
| amount ($\times 10^{-4}$ part by weight) | 5.3 | 5.3 | 5.3 | 5.3 |
| physical properties | | | | |
| viscosity average molecular weight | 15,300 | 15,500 | 22,500 | 22,600 |
| color (pellet L value) | 65 | 65 | 65 | 64 |
| color (pellet b value) | −1.0 | −1.1 | −0.3 | 0.4 |
| side reactivity ($\times 10^{-2}$) | 0.1 or less | 0.1 or less | 0.1 or less | 0.3 |

Ex.: Example

Examples 25 to 28

Polycarbonates were produced in the same manner as in Example 1 except that DPC, bisphenol A, bisphenol A prills, catalysts and melt viscosity stabilizer shown in Table 7 were used. The results are shown in Table 7.

Not described individually, according to the experimental results of Examples 25 to 28, the number of OH terminal groups was 85±3 (eq/ton-PC) and the melt viscosity stability was 0.

As understood from the experimental results, when bisphenol A prills having a particle diameter of 0.2 to 3 mm, a specific surface area of 0.05 to 0.2 g/m², a pore surface area of 0.01 to 0.1 ml/g and a color b value of 2 or more were used, a polycarbonate having a viscosity average molecular weight of 20,000 or less, which could meet very strict polymer color requirements, was advantageously obtained.

It was further discovered that the color durability of a polycarbonate pellet could be advantageously improved by using the bisphenol A prills of the present invention.

Since a pellet may be kept for a long time and its color change may become a subject of discussion, the improvement of color durability is of great significance.

Examples 29 to 31

A polymerization reaction was continued until the viscosity average molecular weight became 22,500 in the same manner as in Example 1 except that DPC, bisphenol A, bisphenol A prills and catalysts shown in Table 7 were used. At this point, 2.1 parts by weight of SAM was added as a terminal capping agent and stirred at 260° C. and 133.3 Pa (1 mmHg) for 10 minutes. Thereafter, 5.26×10⁻⁴ part by weight of DBSP was added as a melt viscosity stabilizer and stirred at 260° C. and 66.7 Pa (0.5 mmHg) for 10 minuets. Finally, a polycarbonate having a viscosity average molecular weight of 22,500, 30 terminal OH groups (eq/ton-polycarbonate) and a melt viscosity stability of 0, a polycarbonate having a viscosity average molecular weight of 22,400, 32 terminal OH groups (eq/ton-polycarbonate) and a melt viscosity stability of 0, and a polycarbonate having a viscosity average molecular weight of 22,500, 30 terminal OH groups (eq/ton-polycarbonate) and a melt viscosity stability of 0 were obtained.

The results including other physical properties are shown in Table 7.

TABLE 7

|  | Ex. 25 | Ex. 26 | Ex. 27 |
|---|---|---|---|
| Type of DPC | cD | cD | cD |
| Type of BPA | fB-b | fB-b | fB-b |
| Catalyst Alkali metal catalyst | | | |
| type | A7 | A7 | A7 |
| amount ($\times 10^{-5}$ part by weight) | 8.2 | 8.2 | 8.2 |
| ($\mu$mol/BPA) | 1 | 1 | 1 |
| basic compound | | | |
| type | B1 | B1 | B1 |
| amount ($\times 10^{-3}$ part by weight) | 5.46 | 5.46 | 5.46 |
| ($\mu$mol/BPA) | 100 | 100 | 100 |
| melt viscosity stabilizer | | | |
| type | DBSP | DBSP | DBSP |
| physical properties | | | |
| amount ($\times 10^{-4}$ part by weight) | 5.26 | 5.26 | 5.26 |
| viscosity average molecular weight | 15,300 | 15,200 | 15,400 |
| color (pellet L value) | 65 | 65 | 65 |
| color (pellet b value) | −0.9 | −1.0 | −1.0 |
| side reactivity ($\times 10^{-2}$) | 0.1 or less | 0.1 or less | 0.1 or less |
| color durability of pellet | | | |
| Δb | 0.5 | 0.5 | 0.4 |
| ΔbMax-Min | 0.4 | 0.4 | 0.4 |
| spectral stability ($\times 10^{-6}$) | 4 | 3 | 3 |

|  | Ex. 28 | Ex. 29 | Ex. 30 | Ex. 31 |
|---|---|---|---|---|
| Type of DPC | cD | cD | cD | cD |
| Type of BPA | fB-c | fB | fB-a | fB-b |
| Catalyst Alkali metal catalyst | | | | |
| type | A7 | A1 | A1 | A1 |
| amount ($\times 10^{-5}$ part by weight) | 8.2 | 5.3 | 5.3 | 5.3 |
| ($\mu$mol/BPA) | 1 | 1 | 1 | 1 |

TABLE 7-continued

| basic compound | | | | |
|---|---|---|---|---|
| type | B1 | B1 | B1 | B1 |
| amount (× $10^{-3}$ part by weight) | 5.46 | 6.46 | 6.46 | 6.46 |
| (μmol/BPA) | 100 | 100 | 100 | 100 |
| melt viscosity stabilizer | | | | |
| type | DBSP | DBSP | DBSP | DBSP |
| amount (× $10^{-4}$ part by weight) | 5.26 | 5.26 | 5.26 | 5.26 |
| physical properties | | | | |
| viscosity average molecular weight | 15,300 | 22,500 | 22,400 | 22,500 |
| color (pellet L value) | 65 | 65 | 65 | 65 |
| color (pellet b value) | −0.7 | 0.5 | −0.1 | −0.1 |
| side reactivity (× $10^{-2}$) | 0.1 or less | 0.2 | 0.1 or less | 0.1 or less |
| color durability of pellet | | | | |
| Δb | 0.7 | 1 | 0.4 | 0.5 |
| ΔbMax-Min | 1.1 | 1.2 | 0.5 | 0.5 |
| spectral stability (× $10^{-6}$) | 8 | 9 | 3 | 3 |

Ex.: Example

Evaluation of Disk Moldability

Example 32

Comparative Example 6

0.01 wt % of tris(2,4,6-di-tert-butylphenyl)phosphite and 0.08 wt % of glycerol monostearate were added to the polycarbonates obtained in Example 1 and Comparative Example 1. Then, the obtained compositions were melt kneaded and pelletized by a vented double-screw extruder (KTX-46 of Kobe Steel Co., Ltd.) while they were devolatilized at a cylinder temperature of 240° C. The pellets were used to mold DVD (DVD-Video) disk substrates and a temperature and humidity deterioration test was made on these substrates.

A DVD mold was set in the DISK3 M III injection molding machine of Sumitomo Heavy Industries, Ltd., a nickel DVD stamper which stored information such as an address signal was attached to this mold, the above pellets were supplied into the hopper of the molding machine automatically, and DVD disk substrates having a diameter of 120 mm and a thickness of 0.6 mm were molded at a cylinder temperature of 380° C., a mold temperature of 115° C., an injection rate of 200 mm/sec and a holding pressure of 3,432 kPa (35 kgf/cm$^2$).

To test the long-term reliability of each optical disk under extreme temperature and humidity conditions, the aromatic polycarbonate optical disk substrates were kept at a temperature of 80° C. and a relative humidity of 85% for 1,000 hours and measured for the following items for evaluation.

number of white points per disk: The optical disk substrates after the temperature and humidity deterioration test were observed through a polarization microscope to count white points having a length of 10 μm or more. This was made on 25 optical disk substrates to obtain an average number of white points per disk and taken as the number of white points.

As a result, the number of white points was 0.1 per disk in Example 16 and 4.6 per disk in Comparative Example 6. Therefore, it is understood that the polycarbonate of the present invention has excellent stability.

Reference Examples 1 and 2 (Production Examples of Polycarbonate by Interfacial Polymerization)

502.8 g (2.21 mols) of bisphenol A (Reference Example 1) or bisphenol A prills (fB-a; Reference Example 2), 2.21 l (4.19 mols of sodium hydroxide) of a 7.2% aqueous solution of sodium hydroxide and 0.98 g (0.0056 mol) of sodium hydrosulfite were fed as raw materials to a 5-liter reactor equipped with a phosgene blow-in tube, thermometer and stirrer and dissolved, 1.27 l of methylene chloride and a 48.5% aqueous solution of sodium hydroxide (0.98 mol of sodium hydroxide) were added under agitation, and 250.80 g (0.253 mol) of phosgene were added at 25° C. in 180 minutes to carry out a phosgenation reaction.

After the end of phosgenation, 17.51 g (0.117 mol) of p-tert-butylphenol, 80.40 g (0.97 mol of sodium hydroxide) of a 48.5% aqueous solution of sodium hydroxide and 1.81 ml (0.013 mol) of triethylamine as a catalyst were added, kept at 33° C. and stirred for 2 hours to terminate the reaction. A methylene chloride layer was separated from the reaction mixture which was then washed with water 10 times to be purified until sodium chloride was not detected in order to obtain a polycarbonate having a viscosity average molecular weight of 15,300. 0.01 wt % of tris(2,4-di-tert-butylphenyl)phosphite and 0.08 wt % of glycerol monostearate were added to and kneaded with the obtained polycarbonate by a double-screw extruder and pelletized.

The obtained polycarbonate pellet of Reference Example 1 had a color b value of 1.1 whereas the obtained polycarbonate pellet of Reference Example 2 had an excellent color b value of −0.4.

Example 33

The aromatic polycarbonate of the above Example 15 was kept molten after polymerization and supplied into the T die of a molding machine quantitatively by a gear pump to be extrusion molded. 0.003 wt % of bis(2,4-di-tert-butylphenyl)pentaerythritol diphosphite was added before the gear pump and the resulting mixture was molded into a sheet having a thickness of 2 mm or 0.2 mm and a width of 800 mm by sandwiching between mirror cooling rolls or touching one side.

A visible light curable plastic adhesive (BENEFIX PC of Ardel Co., Ltd.) was applied to one side of the obtained aromatic polycarbonate sheet (thickness of 2 mm) and two of the sheet were extruded and assembled together such that air bubbles were not contained between the sheets. After assembly, the resulting laminate was exposed to 5,000 mJ/cm$^2$ light from a light curing device equipped with a metal halide lamp for irradiating visible light to cure the adhesive layer.

When the bonding strength of the obtained laminated sheet was measured in accordance with JIS K-6852 (method for testing the compression shear strength of an adhesive), it was 9.92 MPa (101 kgf/cm$^2$).

A uniform mixture of ink (Natsuda 70-9132: 136D smoke color) and a solvent (isophorone/cyclohexane/isobutanol= 40/40/20 (wt %)) was printed on the 0.2 mm-thick aromatic polycarbonate sheet by a silk screen printer and dried at 100° C. for 60 minutes. The printed ink surface was well printed without a transfer failure.

Separately, 30 parts by weight of a polycarbonate resin (specific viscosity of 0.895, Tg of 175° C.) obtained by carrying out a general interfacial polycondensation reaction between 1,1-bis(4-hydroxyphenyl)cyclohexane and phosgene, 15 parts of Plast Red 8370 (of Arimoto Kagaku Kogyo Co., Ltd.) as a dye and 130 part of dioxane as a solvent were uniformaly mixed together to obtain printing ink. A sheet (thickness: 0.2 mm) printed with the above printing ink was set in an injection mold and insert molding was carried out using a polycarbonate resin pellet (Panlite L-1225 of Teijin Kasei Co., Ltd.) at 310° C. The printed portion of the obtained insert molded article had no abnormalities such as bleeding and blurring in pattern and had a good appearance.

Examples 34 to 40

The aromatic polycarbonate of the above Example 30 was kept molten after polymerization and supplied into the extruder by a gear pump. 0.003 wt % of tris(2,4-di-tert-butylphenyl)phosphite and 0.05 wt % of trimethyl phosphate were added before the extruder to obtain an aromatic polycarbonate pellet.

The pellet and components shown in Tables 8 and 9 were uniformly mixed together by a tumbler and the resulting mixture was pelletized by a 30 mm-diameter vented double-screw extruder (KTX-30 of Kobe Steel Co., Ltd.) at a cylinder temperature of 260° C. and a vent pressure of 1.33 kPa (10 mmHg) while it was degassed. The obtained pellet was dried at 120° C. for 5 hours and molded into a test sample for measurement at a cylinder temperature of 270° C. and a mold temperature of 80° C. by a injection molding machine (SG150U of Sumitomo Heavy Industries, Ltd.). The evaluation results are shown in Tables 8 and 9.

TABLE 8

|  |  | Ex. 34 | Ex. 35 | Ex. 36 | Ex. 37 |
|---|---|---|---|---|---|
| Composition |  |  |  |  |  |
| Polycarbonate of Example 30 | wt % | 60 | 60 | 60 | 60 |
| ABS | wt % | 40 | 40 | 40 | — |
| AS | wt % | — | — | — | 30 |
| MBS | wt % | — | — | — | 10 |
| Total | wt | 100 | 100 | 100 | 100 |
| G | wt | 15 | — | — | 15 |
| W | wt | — | 15 | — | — |
| T | wt | — | — | 15 | — |
| WAX | wt | — | 1 | 1 | — |
| Characteristic properties |  |  |  |  |  |
| Flexural modulus | MPa | 3,450 | 3,200 | 2,850 | 3,350 |
| Fluidity | cm | 30 | 29 | 30 | 36 |
| Notched impact value | J/m | 70 | 75 | 55 | 85 |

Ex.: Example
wt: part by weight

TABLE 9

|  |  | Ex. 38 | Ex. 39 | Ex. 40 |
|---|---|---|---|---|
| Composition |  |  |  |  |
| Polycarbonate of Example 30 | wt % | 70 | 70 | + |
| PBT | wt % |  | 30 | 5 |
| PET | wt % | 30 |  | 25 |
| Total | wt % | 100 | 100 | 100 |
| E-1 |  | 5 | 5 |  |
| E-2 | wt |  |  | 5 |
| G | wt | 20 |  |  |
| W | wt |  | 10 |  |
| T | wt |  |  | 10 |
| WAX | wt |  | 1 | 1 |

TABLE 9-continued

|  |  | Ex. 38 | Ex. 39 | Ex. 40 |
|---|---|---|---|---|
| Characteristic properties |  |  |  |  |
| Flexural modulus | MPa | 5,800 | 3,600 | 3,450 |
| Chemical resistance | % | 88 | 86 | 84 |
| Notched impact value | J/m | 220 | 550 | 510 |

Ex.: Example
wt: part by weight (1)-1 ABS: styrene-butadiene-acrylonitrile copolymer; Suntac UT-61; Mitsui Chemicals, Inc.
(1)-2 AS; styrene-acrylonitrile copolymer; Stylac-AS 767 R27; Asahi Chemical Industry, Co., Ltd.
(1)-3 PET: polyethylene terephthalate; TR-8580; Teijin Limited, intrinsic viscosity of 0.8
(1)-4 PBT: polybutylene terephthalate; TRB-H; Teijin Limited, intrinsic viscosity of 1.07
(2)-1 MBS: methyl (meth)acrylate-butadiene-styrene copolymer; Kaneace B-56; Kaneka Corporation
(2)-2 E-1: butadiene-alkyl acrylate-alkyl methacrylate copolymer; Paraloid EXL-2602; Kureha Chemical Industry, Co., Ltd.
(2)-3 E-2: composite rubber having a network structure that a polyorganosiloxane component and a polyalkyl (meth) acrylate rubber component penetrate into each other; Metabrene S-2001; Mitsubishi Rayon Co., Ltd.
(3)-1 T: talc; HS-T0.8; Hayashi Kasei Co., Ltd., average particle diameter L of 5 $\mu$m measured by laser diffraction method, L/D of 8
(3)-2 G: glass fiber; chopped strand ECS-03T-511; Nippon Electric Glass Co., Ltd., urethane bundling, fiber diameter of 13 $\mu$m
(3)-3 W: wollastonite; Saikatec NN-4; Tomoe Kogyo Co., Ltd., number average fiber diameter D obtained by observation through electron microscope of 1.5 $\mu$m, average fiber length of 17 $\mu$m, aspect ratio L/D of 20
(4) WAX: olefin-based wax obtained by copolymerizing $\alpha$-olefin and maleic anhydride; Diacalna P30; Mitsubishi Kasei Co., Ltd. (maleic anhydride content of 10 wt %)
(A) Flexural Modulus The flexural modulus was measured in accordance with ASTM D790.

(B) Notched Impact Value

The impact value was measured by colliding a weight with a 3.2 mm thick test sample from the notch side in accordance with ASTM D256.

(C) Fluidity

The fluidity was measured by an Archimedes type spiral flow (thickness of 2 mm, width of 8 mm) at a cylinder temperature of 250° C., a mold temperature of 80° C. and an injection pressure of 98.1 MPa.

(D) Chemical Resistance

1% strain was provided to a tensile test piece used in ASTM D638 which was then immersed in Esso regular gasoline heated at 30° C. for 3 minutes to measure the tensile strength and calculate the tensile strength retention of the test piece. The retention was calculated from the following equation.

retention (%)=(strength of treated sample/strength of untreated sample)×100

What is claimed is:

1. A process for producing a polycarbonate by melt polycondensing a dihydroxy compound and a carbonic acid diester in the presence of an ester exchange catalyst, wherein a raw material which contains a dihydroxy compound represented by the following formula (1):

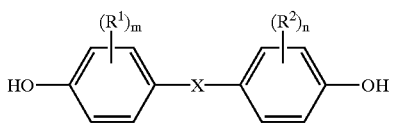

(1)

wherein $R^1$ and $R^2$
are each independently an alkyl group having 1 to 20 carbon atoms, alkoxy group having 1 to 20 carbon atoms, cycloalkyl group having 6 to 20 carbon atoms, aryl group having 6 to 20 carbon atoms, cycloalkoxy group having 6 to 20 carbon atoms or aryloxy group having 6 to 20 carbon atoms, m and n are each independently an integer of 0 to 4, and X is a single bond, oxygen atom, carbonyl group, alkylene group having 1 to 20 carbon atoms, alkylidene group having 2 to 20 carbon atoms, cycloalkylene group having 6 to 20 carbon atoms, cycloalkylidene group having 6 to 20 carbon atoms, arylene group having 6 to 20 carbon atoms or a group having 6 to 20 carbon atoms, and an aldehyde compound in an amount of no more than $3 \times 10^{-6}$ equivalent in terms of an aldehyde group based on 1 mol of the dihydroxy compound represented by the above formula (1) is used as one raw material comprising the above dihydroxy compound and a raw material which contains a carbonic acid diester and an aldehyde compound in an amount of no more than $3 \times 10^{-6}$ equivalent in terms of an aldehyde group based on 1 mol of the carbonic acid diester is used as the other raw material comprising the above carbonic acid diester.

2. The process of claim 1, wherein the one raw material contains an aldehyde compound in an amount of no more than $2 \times 10^{-6}$ equivalent in terms of an aldehyde group based on 1 mol of the dihydroxy compound represented by the above formula (1).

3. The process of claim 1, wherein the other raw material contains an aldehyde compound in an amount of no more than $2 \times 10^{-6}$ equivalent in terms of an aldehyde group based on 1 mol of the carbonic acid diester.

4. The process of claim 1, wherein a combination of the one raw material and the other raw material contains an aldehyde compound in an amount of no more than $3 \times 10^{-6}$ equivalent in terms of an aldehyde group based on 1 mol of the dihydroxy compound represented by the above formula (1).

5. The process of claim 1, wherein the aldehyde compound is an impurity contained in the one raw material and the other raw material.

6. The process of claim 1, wherein the one raw material contains a carboxylic acid compound in an amount of no more than $3 \times 10^{-6}$ equivalent in terms of a carboxyl group based on 1 mol of the dihydroxy compound represented by the above formula (1).

7. The process of claim 1, wherein the other raw material contains a carboxylic acid compound in an amount of no more than $3 \times 10^{-6}$ equivalent in terms of a carboxyl group based on 1 mol of the carbonic acid diester.

8. The process of claim 1, wherein the one raw material is in the form of globular particles which include particles having a diameter of 0.1 to 3 mm in an amount of 70 wt % or more and have a specific surface area of 0.05 to 0.2 $m^2/g$ and a pore volume of 0.01 to 0.1 ml/g.

9. The process of claim 8, wherein the color L and b values of the globular particles are 80 or more and 2 or less, respectively.

10. The process of claim 1, wherein the ester exchange catalyst is a combination of a) at least one basic compound selected from the group consisting of a nitrogen-containing basic compound and a phosphorus-containing basic compound and b) at least one metal compound selected from the group consisting of an alkali metal compound and an alkali earth metal compound.

11. The process of claim 10, wherein the basic compound is used in an amount of $1 \times 10^{-5}$ to $1 \times 10^{-3}$ equivalent based on 1 mol of the dihydroxy compound.

12. The process of claim 10, wherein the metal compound is used in an amount of $5 \times 10^{-8}$ to $5 \times 10^{-6}$ equivalent based on 1 mol of the dihydroxy compound.

13. The process of claim 10, wherein the alkali metal compound is an alkali metal hypophosphite and the alkali earth metal compound is an alkali earth metal hypophosphite.

14. An aromatic polycarbonate pellet which comprises an aromatic polycarbonate composed mainly of a recurring unit represented by the following formula (2):

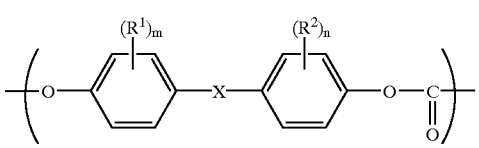

(2)

wherein $R^1$ and $R^2$ are each independently an alkyl group having 1 to 20 carbon atoms, alkoxy group having 1 to 20 carbon atoms, cycloalkyl group having 6 to 20 carbon atoms, aryl group having 6 to 20 carbon atoms, cycloalkoxy group having 6 to 20 carbon atoms or aryloxy group having 6 to 20 carbon atoms, m and n are each independently an integer of 0 to 4, and X is a single bond, oxygen atom, carbonyl group, alkylene group having 1 to 20 carbon atoms, alkylidene group having 2 to 20 carbon atoms, cycloalkylene group having 6 to 20 carbon atoms, cycloalkylidene group having 6 to 20 carbon atoms, arylene group having 6 to 20 carbon atoms or alkylene-arylene-alkylene group having 6 to 20 carbon atoms, and having a viscosity average molecular weight of 10,000 to 17,000 and a value of $1 \times 10^{-6}$ to $20 \times 10^{-6}$ obtained by dividing an average value of absorbance at a wavelength of 400 nm and absorbance at a wavelength of 430 nm by absorbance at a wavelength of 260 nm, and which has a b value measured in accordance with JIS K7105 of $-1.0$ to 0.0.

15. The pellet of claim 14 which has a b value of $-0.5$ to 0.0.

16. A method for producing an optical disk substrate, which comprises forming an optical disk substrate from a pellet of claim 14.

* * * * *